(12) United States Patent
Park

(10) Patent No.: US 8,789,895 B2
(45) Date of Patent: Jul. 29, 2014

(54) HYDRAULIC BRAKE SYSTEM

(75) Inventor: Seung Young Park, Gyeonggi-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 379 days.

(21) Appl. No.: 13/192,960

(22) Filed: Jul. 28, 2011

(65) Prior Publication Data

US 2012/0025599 A1 Feb. 2, 2012

(30) Foreign Application Priority Data

Jul. 28, 2010 (KR) .................. 10-2010-0072848

(51) Int. Cl.
*B60T 17/04* (2006.01)

(52) U.S. Cl.
USPC ......... 303/87; 303/113.5; 303/9.75; 417/542; 138/30

(58) Field of Classification Search
CPC ........ F04B 39/00; F04B 39/0027; B60T 8/48; F15B 1/08; F16L 55/04; F16L 55/02
USPC ............... 303/87, 113.1–113.5, 10, 11, 9.75; 138/26.3, 31; 417/540, 542
See application file for complete search history.

(56) References Cited

U.S. PATENT DOCUMENTS

| | | | | |
|---|---|---|---|---|
| 4,989,924 A | * | 2/1991 | Toda et al. | 303/113.1 |
| 5,567,022 A | * | 10/1996 | Linkner, Jr. | 303/87 |
| 5,803,555 A | * | 9/1998 | Schaefer | 303/87 |
| 6,017,099 A | * | 1/2000 | Schneider et al. | 303/87 |
| 6,231,132 B1 | * | 5/2001 | Watanabe | 303/116.2 |
| 7,093,911 B2 | * | 8/2006 | Hool et al. | 303/113.5 |
| 7,309,112 B2 | | 12/2007 | Isono | |
| 2011/0115283 A1 | * | 5/2011 | Harada et al. | 303/11 |

FOREIGN PATENT DOCUMENTS

| | | |
|---|---|---|
| JP | 05-086737 U | 11/1993 |
| JP | 2010-095023 A | 4/2010 |
| KR | 1997-0001879 | 2/1997 |
| KR | 20-0267460 | 3/2002 |

OTHER PUBLICATIONS

Chinese Office Action for Chinese Application No. 201110264869.3 dated Oct. 10, 2013, 6 pgs.

* cited by examiner

*Primary Examiner* — Melanie Torres Williams
(74) *Attorney, Agent, or Firm* — McDermott Will & Emery LLP

(57) ABSTRACT

A hydraulic brake system includes a master cylinder, a wheel brake, an electronic valve provided to each of an inlet and an outlet of each of wheel brakes, a pump compressing oil stored in a low pressure accumulator such that oil is ejected towards the wheel brake or master cylinder, an orifice disposed near an outlet port of the pump, a first hydraulic circuit connecting a first port of the master cylinder to two wheel brakes to control transmission of hydraulic pressure, and a second hydraulic circuit connecting a second port of the master cylinder to the remaining two wheel brakes to control transmission of hydraulic pressure, wherein a damper unit is disposed between the outlet port of the pump and the orifice to relieve a pulsation phenomenon. The damper unit allows main flow passages of the first and second hydraulic circuits to communicate with each other therethrough.

3 Claims, 2 Drawing Sheets

HYDRAULIC BRAKE SYSTEM

CROSS REFERENCE TO RELATED APPLICATION

This application claims priority from and the benefit of Korean Patent Application No. 10-2010-0072848, filed on Jul. 28, 2010, which is hereby incorporated by reference for all purposes as if fully set forth herein.

BACKGROUND

1. Technical Field

The present disclosure relates to a hydraulic brake system, and more particularly, to a hydraulic brake system capable of reducing pressure pulsation caused by operation of a piston pump driven by a hydraulic motor in operation of the hydraulic brake system.

2. Description of the Related Art

In general, a hydraulic brake system refers to a braking system operated by hydraulic pressure.

Brake systems include an anti-lock brake system (ABS) that prevents slippage of a wheel during braking, a brake traction control system (BTCS) that prevents slippage of a driven wheel upon rapid start or rapid acceleration of a vehicle, a vehicle dynamic control system (VDC) that is a combination of the anti-lock brake and traction control systems and maintains a stable driving state of a vehicle by controlling pressure of a brake liquid, etc.

Such a hydraulic brake system includes a master cylinder for generating a desired pressure for braking, a plurality of electronic valves for controlling hydraulic braking pressure transmitted to wheel brakes of a vehicle, a low pressure accumulator for temporarily storing oil, a hydraulic motor and pumps for pumping out the oil temporarily stored in the low pressure accumulator, orifices for reducing pressure pulsation of the oil pumped by the pumps, an electronic control unit (ECU) for electrically controlling the electronic valves and the pump, and the like. Further, a valve assembly of the electronic valves, the accumulator, the pumps, the hydraulic motor, and the like are installed in an aluminum hydraulic block (modulator block). The ECU is connected to the hydraulic block and includes an ECU housing which receives a coil assembly of the electronic valves and a circuit board.

Recently, since driving comfort has become a major concern in designing a vehicle, there is a need to enhance driving comfort.

In the hydraulic brake system described above, although the orifice disposed near an outlet port of each pump reduces pressure pulsation caused by operation of the pump in to a process of multiplying braking pressure, there is difficulty achieving complete reduction of the pressure pulsation since the orifice is provided to control a cross-sectional area of a flow passage for the purpose of damping reduction.

Further, pressure pulsation may be reduced by increasing the number of pistons of the pump. In this case, however, there is a problem of increase in manufacturing costs through increase of the weight and volume of the hydraulic motor for improving performance of the hydraulic motor. Moreover, the peak of pressure pulsation continuously generated due to operation of the pump can act as a source of noise of the hydraulic brake system.

BRIEF SUMMARY

The present disclosure is directed to solving the problems of the related art, and an aspect of the present disclosure provides a hydraulic brake system capable of reducing periodic pressure pulsation caused by operation of a pump.

In accordance with an aspect of the present disclosure, a hydraulic brake system includes: a master cylinder generating braking hydraulic pressure by operation of a brake pedal; a wheel brake provided to each of front right and left wheels and rear right and left wheels of a vehicle and receiving the braking hydraulic pressure from the master cylinder to generate braking force; an electronic valve provided to each of an inlet and an outlet of each of the wheel brakes to control flow of the braking hydraulic pressure; a low pressure accumulator temporarily storing oil, which is ejected from the wheel brakes during a pressure reduction braking operation in which the electronic valves are operated; a pump compressing the oil stored in the low pressure accumulator such that the oil is ejected towards the wheel brake or the master cylinder as needed; an orifice disposed near an outlet port of the pump; a first hydraulic circuit connecting a first port of the master cylinder to two wheel brakes to control transmission of hydraulic pressure; and a second hydraulic circuit connecting a second port of the master cylinder to the remaining two wheel brakes to control transmission of hydraulic pressure, wherein a damper unit is disposed between the outlet port of the pump and the orifice to relieve a pulsation phenomenon. Here, the damper unit allows main flow passages of the first and second hydraulic circuits to communicate with each other therethrough.

The damper unit may include a cylinder through which the main flow passages communicate with each other, and a resilient damper disposed within the cylinder to reciprocate therein.

The damper unit may further include a displacement restricting member having a protrusion to restrict displacement of the damper; a securing cap securing the displacement restricting member; and a support member supporting the securing cap, and the damper may include a damping groove receiving the displacement restricting member to relieve pulsation.

DETAILED DESCRIPTION

Hereinafter, exemplary embodiments of the present disclosure will be described in detail with reference to the accompanying drawings.

Figure 1:
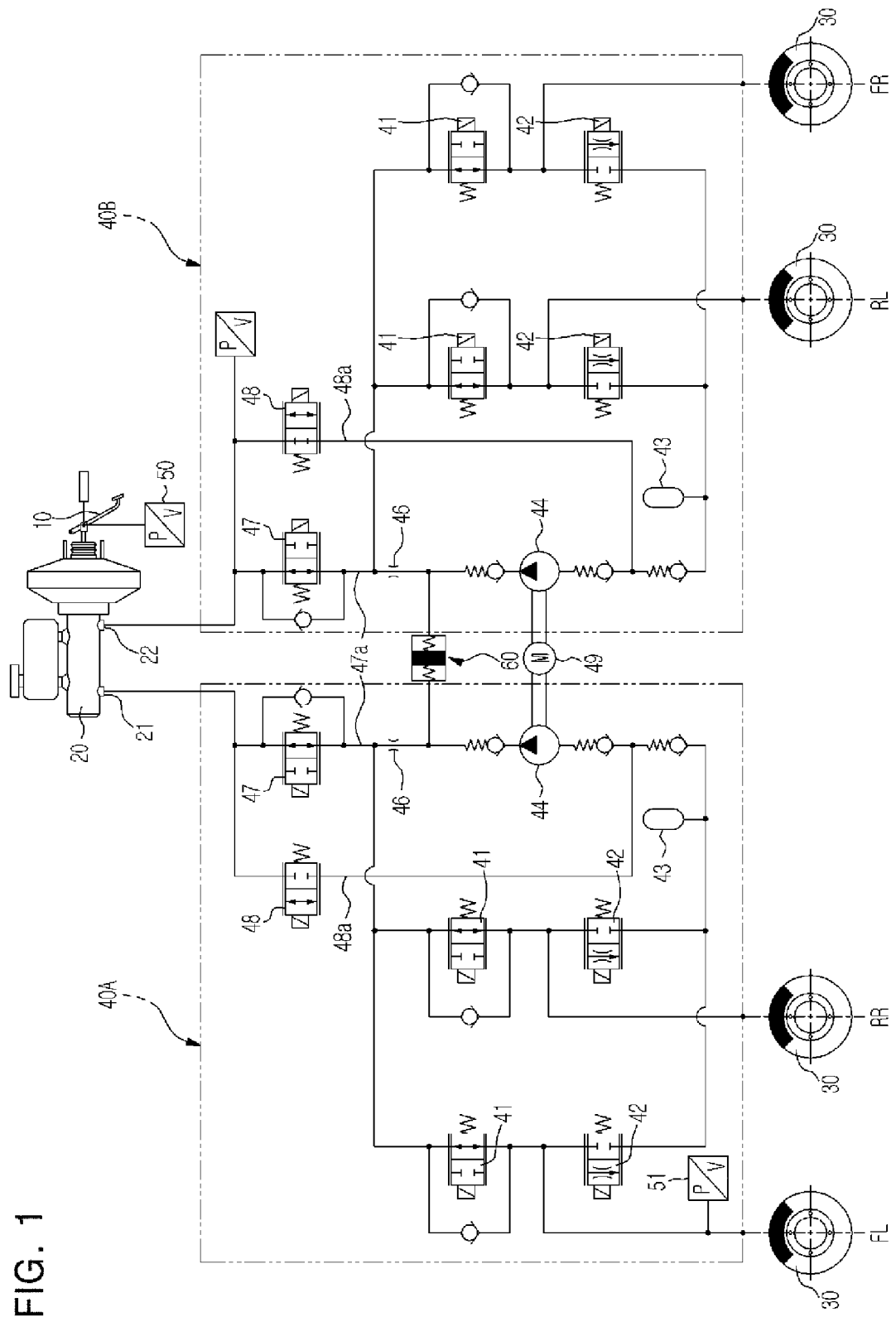
FIG. 1 is a diagram of a hydraulic brake system in accordance with an exemplary embodiment of the present disclosure.

Referring to FIG. 1, a hydraulic brake system according to an exemplary embodiment of the present disclosure includes a brake pedal 10 receiving operational force of a driver, a brake booster multiplying pedal force of the brake pedal 10 using a difference between a vacuum and atmospheric pressure, a master cylinder 20 generating pressure with the brake booster, a first hydraulic circuit 40A connecting a first port (not shown) of the master cylinder 20 to two wheel brakes 30 (or wheel cylinders) to control transmission of hydraulic pressure, and a second hydraulic circuit 40B connecting a second port (not shown) of the master cylinder 20 to the remaining two wheel brakes 30 to control transmission of hydraulic pressure. The first and second hydraulic circuits 40A, 40B are compactly installed in a hydraulic block (not shown).

Referring to FIG. 1, each of the first and second hydraulic circuits 40A, 40B includes a plurality of electronic valves 41, 42, each of which controls braking hydraulic pressure transmitted to two wheel brakes 30, a pump 44 which suctions oil discharged from the wheel brakes 30 or from the master cylinder 20 to pump the oil, a low pressure accumulator which temporarily stores the oil discharged from the wheel brakes 30, an orifice 46 which reduces pressure pulsation caused by hydraulic pressure of the oil pumped by the pump 44, and an assistant flow passage 48a which guides the oil from the master cylinder 20 into an inlet of the pump 44 in a TCS mode.

As shown in FIG. 1, the assistant flow passage 48a is bifurcated from a main flow passage 47a to guide the oil to be suctioned from the master cylinder 20 towards the inlet of the pump 44, and is provided with a shuttle valve 48 which allows the oil to flow only towards the inlet of the pump 44. The shuttle valve 48 operated by electric power is located at the middle of the assistant flow passage 48a and is normally closed but is opened in the TCS mode.

In FIG. 1, the plurality of electronic valves 41, 42 is located upstream and downstream of the wheel brakes 30. Specifically, the electronic valves 41, 42 are divided into a normal open (NO)-type electronic valve 41 which is placed upstream of each of the wheel brakes 30 and is normally maintained in an open state, and a normal closed (NC)-type electronic valve 42 which is placed downstream of each of the wheel brakes 30 and is normally maintained in a closed state. Opening/closing of the electronic valves 41, 42 is controlled by an electronic control unit (ECU, not shown), which detects the speed of the vehicle through a wheel speed sensor provided to each of the wheels. When the NC-type electronic valve 42 is opened by pressure reduction braking, oil is discharged from the wheel brakes 30 and temporarily stored in the low pressure accumulator. The pump 44 is driven by the hydraulic motor 49 and suctions the oil stored in the low pressure accumulator to eject the oil towards the orifice 46, so that hydraulic pressure is transmitted towards the wheel brakes 30 or the master cylinder 20.

Further, referring to FIG. 1, the main flow passage 47a connecting the master cylinder 20 to the outlet of the pump 44 is provided with the NO-type electronic valve 41 for traction control. The NO-type electronic valve 41 is normally maintained in an open state, allowing braking hydraulic pressure generated by the master cylinder 20 in general braking operation through the brake pedal to be transmitted to the wheel brakes 30 through the main flow passage 47a.

The brake booster is provided with a pressure sensor which detects a vacuum in the brake booster and atmospheric pressure, and front left and right wheels FL, FR and rear left and right wheels RL, RR are respectively provided with wheel pressure sensors for detecting actual braking pressure. These pressure sensors are electrically connected to the ECU to be controlled thereby.

Figure 2:
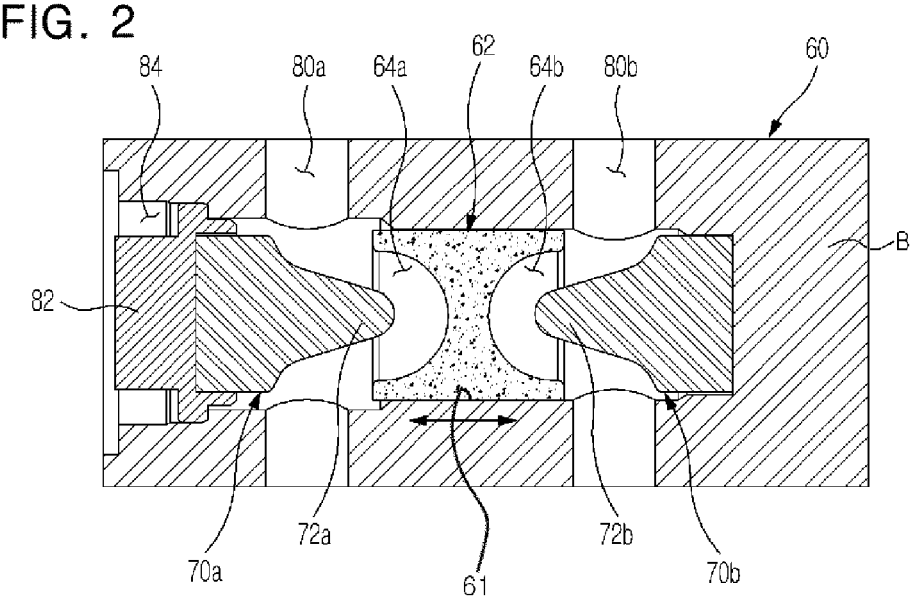
FIG. 2 is a cross-sectional view of a damper unit of the hydraulic brake system in accordance with the exemplary embodiment of the present disclosure.

Further, as shown in FIGS. 1 and 2, the damper unit 60 is disposed between the outlet port of the pump 44 and the orifice 46 to reduce pressure pulsation caused by operation of the pump 44. The damper unit 60 is configured to allow main flow passages 47a of the first and hydraulic circuits 40A, 40B installed in the hydraulic block to communicate with each other therethrough. In other words, as shown in FIG. 2, the damper unit 60 includes the hydraulic block B which is provided with a cylinder 61 through which the respective main flow passages 47a of the first and second hydraulic circuits 40A, 40B communicate with each other. Further, the cylinder 61 is provided therein with a damper 62 which serves to reduce pressure pulsation by the pump 44. The damper 62 is formed of an elastic material so as to absorb hydraulic pressure generated by the pump 44.

Referring to FIG. 2, the damper unit 60 is provided with displacement restricting members 70a, 70b for restricting displacement of the damper 62. The displacement restricting members 70a, 70b are coupled to a securing cap 82 which may secure the displacement restricting members 70a, 70b. The securing cap 82 is coupled to a support member 84 which secures the securing cap 82 with respect to the hydraulic block B. Accordingly, the displacement restricting members 70a, 70b may be firmly supported on the hydraulic block.

As shown in FIG. 2, the damper 62 is formed with damping grooves 64a, 64b which receive the displacement restricting members 70a, 70b, respectively. The displacement restricting members 70a, 70b are formed with displacement restricting protrusions 72a, 72b, each of which has a blunt tip. The displacement restricting protrusions 72a, 72b are received in the damping grooves 64a, 64b, respectively.

Thus, the damper unit 60 may control pressure pulsation of the first and second hydraulic circuits 40A, 40B while allowing the damper 62 to reciprocate within the cylinder 61, such that displacement of the damper 62 is restricted by the displacement restricting members 70a, 70b having the displacement restricting protrusions 72a, 72b formed thereon, thereby facilitating installation and assembly while improving energy efficiency of the vehicle.

Next, operation and effects of the hydraulic brake system according to the exemplary embodiment will be described with reference to FIGS. 1 and 2.

First, a driver steps on the brake pedal 10 to decelerate during vehicle driving or to maintain a stopped state of the vehicle. Then, the brake booster 11 multiplies pedal force, with which the master cylinder 20 generates a significant braking hydraulic pressure. The braking hydraulic pressure is transmitted to the front wheels FR, FL and the rear wheels RR, RL through the electronic valves 41, 42, thereby performing braking. Then, when the driver gradually or completely removes their foot from the brake pedal 10, oil pressure in each of the wheel brakes 30 returns to the master cylinder 20 through the electronic valves 41, 42, thereby reducing braking force or completely releasing braking operation.

On the other hand, although regular half-sine waves of pressure pulsation are generated in the hydraulic brake system due to a pair of pumps 44 operated to have a phase difference of 180 degrees by a single hydraulic motor 49 during braking, the regular half-sine waves of pressure pulsation are reduced by the damper unit 60.

That is, oil flowing through the outlet port of each of the pumps 44 is supplied to the damper unit 60, the cross-sectional area of which is changed by the piston and springs, to provide equilibrium of pressure between the hydraulic circuits, thereby substantially reducing pressure pulsation.

Accordingly, the regular half-sine waves of pressure pulsation are completely removed through the damper unit 60 and the orifices 46, and uniform oil pressure is transmitted to the master cylinder 20 or the electronic valves 41, 42.

As such, in the hydraulic bake system according to the exemplary embodiments, the damper unit is disposed between an outlet port of the pump and the orifice to reduce pressure pulsation during operation of the pump such that noise is reduced when controlling the hydraulic brake system, thereby enhancing driver comfort.

The various embodiments described above can be combined to provide further embodiments. Aspects of the embodiments can be modified, as necessary, to employ concepts of the various patents, applications and publications to provide yet further embodiments. These and other changes can be made to the embodiments in light of the above-detailed description. In general, in the following claims, the terms used should not be construed as limiting the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hydraulic brake system comprising: a master cylinder generating braking hydraulic pressure by operation of a brake pedal; a wheel brake provided to each of front right and left wheels and rear right and left wheels of a vehicle and receiving the braking hydraulic pressure from the master cylinder to generate braking force; an electronic valve provided to each of an inlet and an outlet of each of the wheel brakes to control flow of the braking hydraulic pressure; a low pressure accumulator temporarily storing oil, which is ejected from the wheel brake during a pressure reduction braking operation in which the electronic valves are operated; a pump compressing the oil stored in the low pressure accumulator such that the oil is ejected towards the wheel brake or the master cylinder as needed; an orifice disposed near an outlet port of the pump; a first hydraulic circuit connecting a first port of the master cylinder to two wheel brakes to control transmission of hydraulic pressure; and a second hydraulic circuit connecting a second port of the master cylinder to the remaining two wheel brakes to control transmission of hydraulic pressure, wherein a damper unit is disposed between the outlet port of the pump and the orifice to relieve a pulsation phenomenon, the damper unit allowing main flow passages of the first and second hydraulic circuits to communicate with each other therethrough, wherein the damper unit comprises a cylinder through which the main flow passages communicate with each other, a damper disposed within the cylinder to laterally reciprocate therein, and displacement restricting members disposed in both ends of the cylinder to restrict displacement of the damper, and wherein the damper comprises damping grooves receiving the displacement restricting members to relieve pulsation, and each of the displacement restricting members comprises a protrusion facing each of the damping grooves of the damper.

2. The hydraulic brake system of claim 1, wherein the damper is formed of an elastic material.

3. The hydraulic brake system of claim 2, wherein the damper unit further comprises a securing cap securing the displacement restricting member, and a support member supporting the securing cap.

* * * * *